R. A. RUFF.
POULTRY BROODER.
APPLICATION FILED MAR. 1, 1911.
1,005,886.
Patented Oct. 17, 1911.
2 SHEETS—SHEET 2.
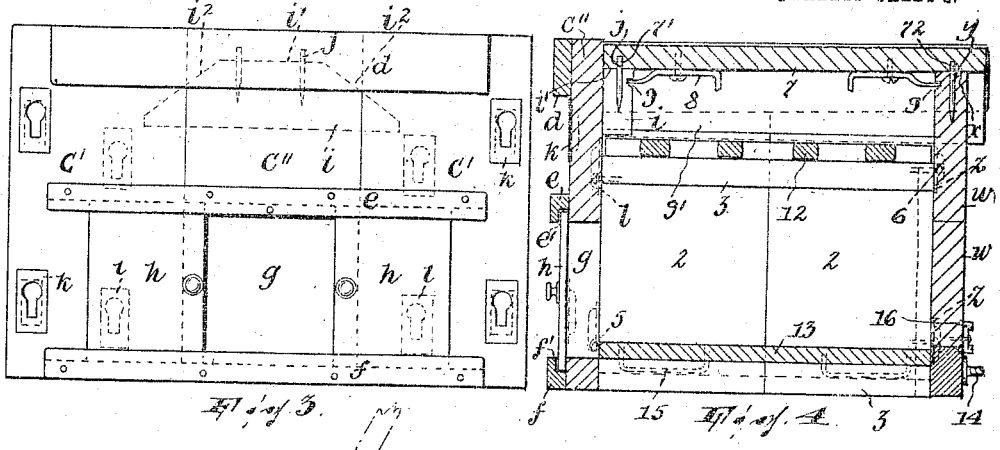
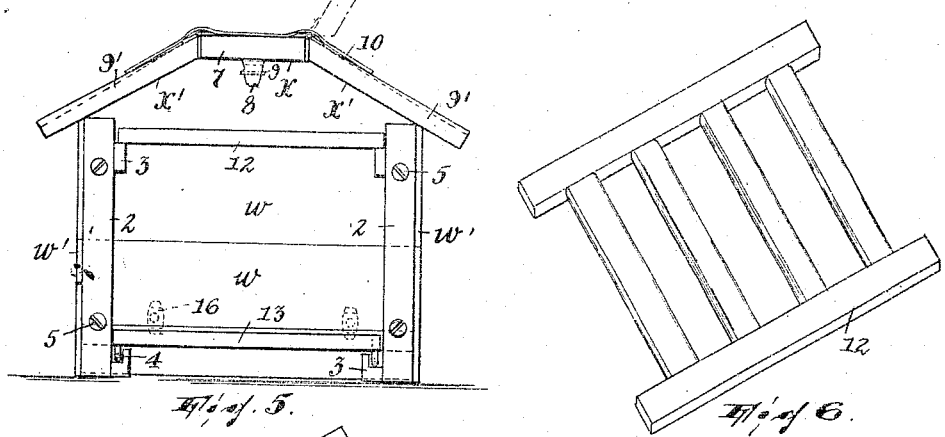
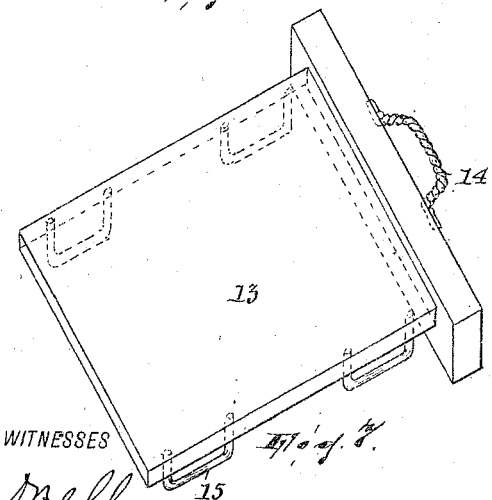
WITNESSES
Wm Bell.
Elsie Kaufmann
INVENTOR,
Reuben A. Ruff,
BY
ATTORNEY.

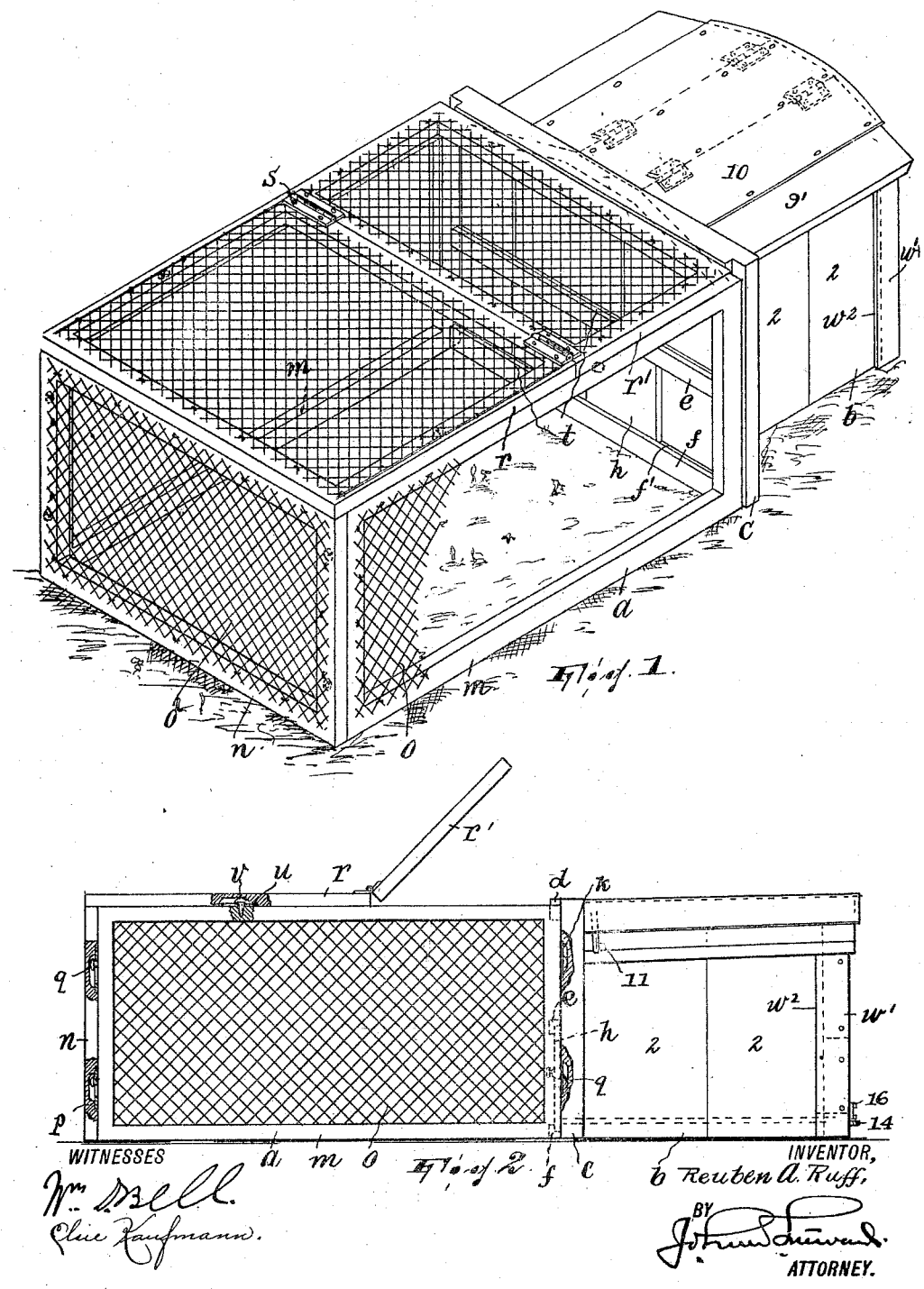

UNITED STATES PATENT OFFICE.

REUBEN A. RUFF, OF HALEDON, NEW JERSEY.

POULTRY-BROODER.

1,005,886.

Specification of Letters Patent.   Patented Oct. 17, 1911.

Application filed March 1, 1911. Serial No. 611,647.

*To all whom it may concern:*

Be it known that I, REUBEN A. RUFF, a citizen of the United States, residing at Haledon, in the county of Passaic and State of New Jersey, have invented certain new and useful Improvements in Poultry-Brooders, of which the following is a specification.

My invention relates to poultry brooding appliances and it consists in certain improvements therein having for their object to provide in a simple, durable, sanitary and inexpensive structure a combined screened inclosure and housing which may be readily assembled and disassembled and to which at all times access may be conveniently had for any of the purposes involving the care of the young chicks.

In the accompanying drawings my invention will be found fully illustrated, Figure 1 being a perspective view; Fig. 2 a view in side elevation, portions appearing in section; Fig. 3 an end elevation of the housing from the side thereof adjoining the screened inclosure, which is removed; Fig. 4 a vertical sectional view through said housing; Fig. 5 a view of the housing similar to that shown in Fig. 3 except that a certain partition is removed; Fig. 6 a perspective view of a grating for the housing; and Fig. 7 a perspective view of a removable slide forming the bottom of the housing.

The screened inclosure $a$ and housing $b$ are each formed in sections, so that they may be readily taken apart and packed in small compass and as readily assembled, and then all united to a common partition or wall $c$ so as to form a unitary structure. The parts $a$, $b$, and $c$ are shown assembled in Figs. 1 and 2.

The wall $c$ comprises three (more or less) sections $c'$ $c''$ arranged edge to edge and held together on one side by the battens $d$, $e$ and $f$, the section $c''$ being shorter than the other two sections and therefore forming an opening or passage $g$ which may be closed by one or two slides $h$ running in rabbets $e'$, $f'$ in the two battens $e$ and $f$. On the opposite side of the partition $c$, centrally and near the top thereof, is secured a ledge $i$ having a horizontal top surface $i'$ and an inclined surface $i^2$ on each side thereof, pins $j$ projecting upwardly from the horizontal surface; the purpose of these pins will appear later.

All of the battens $d$, $e$ and $f$ terminate short of the side edges of the wall $c$ in the same vertical lines, and to the corresponding face of said wall between each side edge thereof and the vertical line in which are disposed the adjoining ends of the battens are screwed key-hole sockets $k$, one above the other; on the opposite face of the wall $c$ are secured, relatively outside of the vertical line occupied by each end of the ledge $i$, a pair of other key-hole sockets $l$, one above the other.

Turning, now, to the screened inclosure, $m$, $m$ are rectangular side frames and $n$ a rectangular end frame, the said frames being provided with screening $o$. The end frame $n$ in the assembled relation of the brooder stands parallel with the partition or wall $c$ and, in opposite relation to each pair of sockets $k$ on the wall $c$, said end frame $m$ has several key-hole sockets $p$. Each of the side frames $m$ has at each end thereof the screws or other headed devices $q$ corresponding to and adapted to enter and interlock with the key-hole sockets $k$ of the partition $c$ and the sockets $p$ of the end frame $n$, the entire structure when assembled being reinforced by the said frames abutting against the ends of the battens $d$, $e$ and $f$ on the partition $c$.

Surmounting the side frames $m$ and end frame $n$ is a cover comprising a fixed section $r$ and a pivoted section $r'$, the latter being connected with the former by the hinges or butts $s$. Each of the sections $r$, $r'$ consists of a rectangular frame provided with screening $t$. On the under side of the frame $r$ are secured the key-hole sockets $u$, the same receiving screws or other headed devices $v$ on the tops of the frames $m$, $m$. When the cover has been fitted to the side and end frames $m$ and $n$, its pivoted section or frame $r'$, when horizontal, snugly abuts against the batten $d$ and thus insures the parts being held together; for the cover may only be detached from the screws $v$ by sliding it toward wall $c$, and so long as it is interlocked with the walls $m$ the walls $m$ and $n$ cannot be separated because wall $n$ is prevented at that time from being raised to effect its release (the only way in which it can be released) from the walls $m$.

It will be understood that the purpose of pivoting the section or frame $r'$ is to allow access to the inclosure $a$.

Describing, now, the housing $b$, the end wall thereof consists of sections of wood $w$ secured together along their side edges by flat strips $w'$ whose inner edges $w^2$ project out of the plane of the inner faces of said sections, forming flanges. (Figs. 1 and 2.)

The said end wall $w$ has a flat top surface $x$ and two beveled surfaces $x'$, the same corresponding to the surface $i'$ and $i''$ of the ledge $i$; $y$ designates pins projecting upwardly from the surface $x$ and corresponding to the pins $j$.

$z$, $z$ designate key-hole sockets corresponding to the several sockets $l$ on the partition $c$.

The sides of the housing consist of sections of wood 2, 2, secured together by upper and lower battens 3, 3, the latter being channeled at 4. Both of the vertical edges of the sides referred to are provided with screws or other headed devices 5 and 6 adapted respectively to be received by the key-hole sockets $l$ and $z$ and so hold the sides, the wall $c$ and the end wall in assembled relation, the side walls being overlapped by the flanges $w'$ as shown in Figs. 1 and 2.

Resting on the surfaces $i'$ and $x$ of the ledge and end wall of the housing and doweled thereto are the ends of a strip 7, the dowel-joints being afforded by holes $7'$ and $7^2$ to receive the pins $j$ and $y$, and to secure the strip down in position, I provide clips 8 pivoted to the under side thereof and each having one end adapted to enter a notch 9 in the ledge $i$ and end wall of the housing. To each lateral edge of the strip 7 is hinged a lid or wing $9'$ which rests upon the surface $x'$ and $i^2$ and therefore closes the opening afforded in the top of the housing at each side of the strip 7; each lid 9 may be swung up to the dotted line position in Fig. 5 to allow ventilation or to have access to the interior of the housing. To keep out moisture, the roof formed by the parts 7 and $9'$ may be covered by a piece of flexible waterproof material 10, each of the wings $9'$ having a groove 11 which will intercept the water draining from said roof and prevent it entering the housing adjacent the wall $c$.

12 is a grating resting on the upper battens 3 to prevent the chicks from escaping and predatory birds or animals from having access to them while allowing ventilation, and 13 is a removable slide or false bottom having a handle 14 and the U-shaped runners 15, said slide being supported by the lower battens 3 and its runners 15 being received by the channels 4, 16 designating buttons to keep the slide 13 from being withdrawn.

The grating, being a rigid member and fitting fairly snugly between the side walls, as well as between the end wall and partition, imparts rigidity to the wall-structure of the housing so that in shifting the brooder about from place to place undue strain is not imposed on the joints between the parts thereof.

Having thus fully described my invention, what I claim as new and desire to secure by Letters Patent is:—

1. In combination with a vertical partition, an end-frame arranged parallel with said partition, key-hole sockets in the adjoining faces of said partition and end-frame and each having its wider portion at its upper end, side-frames arranged between said partition and end-frame and each having headed devices entering said sockets and separably interlocking the partition, end-frame and side-frames, and each also having headed devices on its upper edge, and a cover comprising a fixed section resting on said upper edges of the side-frames, overlapping the end-frame and having key-hole sockets on its under side receiving the headed devices on said upper edges of the side-frames and each having its wider portion at the end thereof adjoining the end-frame, said cover also comprising a hinged section resting upon said upper edges of the side-frames and fitted snugly between the hinged section and the partition, substantially as described.

2. In combination, with a surrounding wall-structure comprising a vertical partition, an end-wall arranged parallel thereto, parallel side-walls arranged between the partition and end-wall, and means for separably interlocking each side wall to the partition and end-wall, a relatively narrow intermediate strip surmounting the end wall and partition and having a dowel-connection with each of them, wings pivoted to the longitudinal edges of said strip and coacting therewith to cover the space formed by said partition and end-wall and side-walls, clips pivoted on the under side of the strip, said partition and end-wall having recesses to receive said clips and coact therewith in separably interlocking the strip with said end-wall and partition, and a removable rigid member inclosed in and supported by said wall-structure and fitting the space thereof and thereby holding the partition, end wall and side-walls in fixed relation to each other, substantially as described.

In testimony whereof I affix my signature in presence of two witnesses.

REUBEN A. RUFF.

Witnesses:
JOHN W. STEWARD,
WM. D. BELL.